United States Patent
de Cesare et al.

(10) Patent No.: US 11,263,326 B2
(45) Date of Patent: Mar. 1, 2022

(54) METHOD AND APPARATUS FOR SECURE SYSTEM BOOT

(71) Applicant: Apple Inc., Cupertino, CA (US)

(72) Inventors: Joshua P. de Cesare, Campbell, CA (US); Timothy R. Paaske, Cupertino, CA (US); Xeno S. Kovah, Mountain View, CA (US); Nikolaj Schlej, Sunnyvale, CA (US); Jeffrey R. Wilcox, San Jose, CA (US); Ezekiel T. Runyon, San Francisco, CA (US); Hardik K. Doshi, Los Altos, CA (US); Kevin H. Alderfer, San Francisco, CA (US); Corey T. Kallenberg, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 15/721,365

(22) Filed: Sep. 29, 2017

(65) Prior Publication Data
US 2018/0349608 A1 Dec. 6, 2018

Related U.S. Application Data

(60) Provisional application No. 62/514,766, filed on Jun. 2, 2017.

(51) Int. Cl.
*G06F 9/4401* (2018.01)
*G06F 21/57* (2013.01)
*G06F 21/44* (2013.01)

(52) U.S. Cl.
CPC .......... *G06F 21/575* (2013.01); *G06F 9/4406* (2013.01); *G06F 21/44* (2013.01)

(58) Field of Classification Search
CPC ........... G06F 21/575; G06F 9/44; G06F 21/44
(Continued)

(56) References Cited

U.S. PATENT DOCUMENTS 7,676,840 B2  3/2010  Morais
8,667,580 B2 *  3/2014  Bhatt ................... G06F 21/575
                                                        380/28

(Continued)

FOREIGN PATENT DOCUMENTS

EP   1679632      7/2006
EP   1679632 A2   7/2006
WO   2014175866   10/2014

OTHER PUBLICATIONS

Unified Extensible Firmware Interface, published May 31, 2016, available at https://en.wikipedia.org/w/index.php?title=Unified_Extensible_Firmware_Interface&oldid=722961978 [hereinafter UEFI Wiki], (Year: 2016).*

(Continued)

*Primary Examiner* — Paul Yen
(74) *Attorney, Agent, or Firm* — Kowert, Hood, Munyon, Rankin & Goetzel, P.C.

(57) ABSTRACT

A method and apparatus for performing a secure boot of a computer system is disclosed. A computer system according to the disclosure includes an auxiliary processor and a main processor. The boot process includes initially booting the auxiliary processor. The auxiliary processor includes a non-volatile memory storing boot code for the main processor. The auxiliary processor may perform a verification of the boot code. Subsequent to verifying the boot code, the main processor may be released from a reset state. Once the main processor is no longer in the reset state, the boot code may be provided thereto. Thereafter, the boot procedure may continue with the main processor executing the boot code.

20 Claims, 9 Drawing Sheets

(58) Field of Classification Search
USPC .......................................................... 713/1, 2
See application file for complete search history.

(56) References Cited

U.S. PATENT DOCUMENTS

| | | | |
|---|---|---|---|
| 8,984,265 B2 | 3/2015 | Vaid | |
| 9,047,471 B2 | 6/2015 | Polzin | |
| 9,202,061 B1 | 12/2015 | Polzin et al. | |
| 9,235,710 B2 | 1/2016 | Jacobs | |
| 9,779,241 B2 | 10/2017 | Jacobs et al. | |
| 2006/0026417 A1* | 2/2006 | Furusawa | G06F 21/575 713/2 |
| 2006/0129744 A1 | 6/2006 | Rothman et al. | |
| 2006/0149959 A1* | 7/2006 | Rothman | G06F 9/4406 713/2 |
| 2007/0050852 A1* | 3/2007 | Yoshii | G06F 21/445 726/27 |
| 2008/0168275 A1* | 7/2008 | De Atley | G06F 21/51 713/189 |
| 2009/0217054 A1 | 8/2009 | Haider et al. | |
| 2009/0327743 A1* | 12/2009 | Finlayson | G06F 21/32 713/186 |
| 2013/0212369 A1 | 8/2013 | Imtiaz et al. | |
| 2014/0068275 A1 | 3/2014 | Swanson | |
| 2014/0129820 A1 | 5/2014 | Lim et al. | |
| 2014/0181494 A1 | 6/2014 | Kayama | |
| 2014/0189336 A1 | 7/2014 | Ballesteros et al. | |
| 2014/0250291 A1* | 9/2014 | Adams | G06F 21/57 713/2 |
| 2015/0089209 A1 | 3/2015 | Jacobs et al. | |
| 2015/0089238 A1 | 3/2015 | Lewis | |
| 2015/0199520 A1 | 7/2015 | Woolley et al. | |
| 2015/0235029 A1* | 8/2015 | Morishige | G06F 21/572 713/1 |
| 2016/0125187 A1 | 5/2016 | Oxford | |
| 2017/0085383 A1* | 3/2017 | Rao | G06F 3/0632 |
| 2017/0222815 A1 | 8/2017 | Meriac et al. | |
| 2018/0144136 A1* | 5/2018 | Nadarajah | G06F 9/4405 |
| 2018/0165455 A1* | 6/2018 | Liguori | G06F 21/575 |
| 2018/0198629 A1* | 7/2018 | Deymonnaz | H04L 9/3265 |

OTHER PUBLICATIONS

International Search Report and Written Opinion in Appl. No. PCT/US2018/063686 dated Mar. 21, 2019, 11 pages.
International Search Report and Written Opinion in PCT Appl. No. PCT/US2018/035057 dated Sep. 7, 2018, 9 pages.
International Search Report and Written Opinion in Appl. No. PCT/US2018/063685 dated Mar. 21, 2019, 10 pages.
Written Opinion in Application No. PCT/US2018/035057 dated May 9, 2019.

* cited by examiner

METHOD AND APPARATUS FOR SECURE SYSTEM BOOT

PRIORITY INFORMATION

This application claims the benefit of U.S. Provisional Application No. 62/514,766, filed on Jun. 2, 2017, which is incorporated by reference herein in its entirety.

BACKGROUND

Technical Field

This disclosure is directed to computer systems, and more particularly, to security during the booting of computer systems.

Description of the Related Art

The beginning of operation in a computer system begins with a process known as boot, or "booting up." Firmware in a computer system may provide the first instructions that are executed by a processor thereof, thereby beginning the boot process. From there, the processor may execute instructions to perform functions such as configuring I/O drivers, loading an operating system kernel, and so forth. Upon successful completion of the boot process, the computer system is ready for normal operation.

One of the times that a computer may be vulnerable to attacks by malicious software is during the boot process. Accordingly, many computer systems are designed with extra security measures to ensure that they are not compromised during the boot process. Despite these measures, an attacker may nevertheless gain access to the system, e.g., to an operating system kernel. Once the attacker has gained access, the firmware used to boot the system can be altered, variables used in booting the computer system can be altered, and information can be stolen. Thus, the computer itself may be compromised, as may one or more users of the system.

SUMMARY

A method and apparatus for performing a secure boot of a computer system is disclosed. In one embodiment, a computer system includes an auxiliary processor and a main processor. The boot process includes initially booting the auxiliary processor. The auxiliary processor includes a non-volatile memory storing boot code for the main processor. The auxiliary processor may perform a verification of the boot code. Subsequent to verifying the boot code, the main processor may be released from a reset state. Once the main processor is no longer in the reset state, the boot code may be provided thereto. Thereafter, the boot procedure may continue with the main processor executing the boot code.

In one embodiment, verifying the boot code may include verifying an association thereof with an identifier that is unique to the computer system. Upon successful completion of the verification, a system management control circuit implemented in the auxiliary processor may provide an indication of the same. Responsive to the indication, a platform controller hub in the computer system may read the boot code and provide it to the main processor.

Verification of the boot code may include determining that a hash of the boot code matches a hash stored in a file that includes verification information. The verification may also determine that the file includes a signature from the manufacturer of the computer system.

In some embodiments, the sequence of the boot procedure may vary relative to others. In one exemplary embodiment, the auxiliary processor may be completely booted prior to releasing the main processor from reset and transferring the boot code thereto. In another exemplary embodiment, the main processor may be released from reset and the boot code transferred thereto prior to the auxiliary processor completing its boot process. In this latter embodiment, the booting of the main and auxiliary processors may overlap in time, and thus both may be executing respective boot procedures concurrently.

Embodiments are also possible and contemplated wherein, in a network-connected computer system, failure of a verification results in the computer system contacting the manufacturer. The manufacturer may respond by generating and conveying one or more properly signed files to the computer system that can pass the verification process. Thereafter, the received files may be verified and the boot process may continue.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Figure 1:
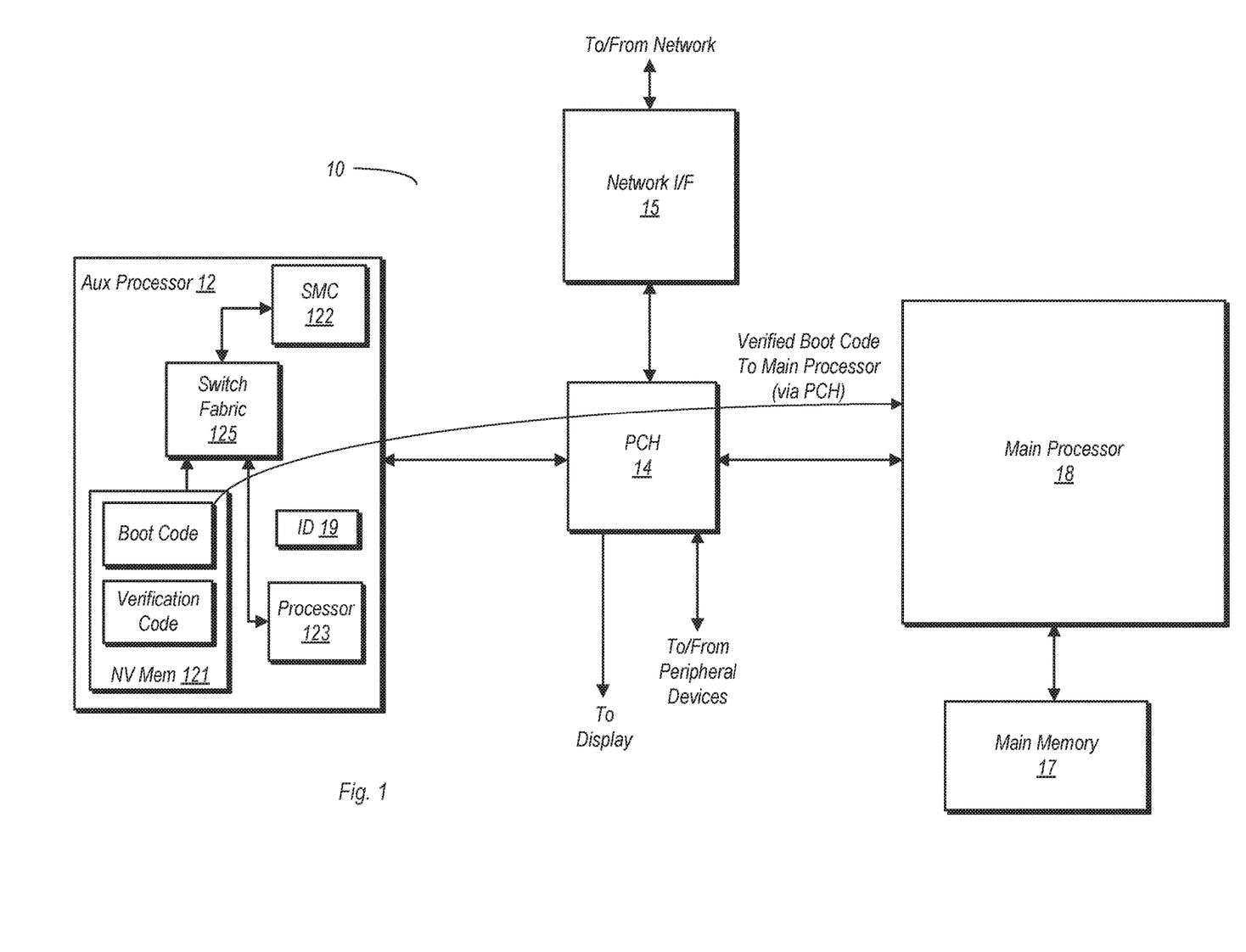
FIG. 1 is a block diagram of one embodiment of a computer system having main and auxiliary processors.

Turning now to FIG. 1, a block diagram of one embodiment of a computer system is shown. The embodiment of computer system 10 is exemplary and is not intended to be limiting. The various units shown here may be implemented as integrated circuits, or as parts thereof.

Computer system 10 in the embodiment shown includes a main processor 18 and an auxiliary processor 12. Main processor 18 may be one of a number of different types of processors used in various types of computer systems. In one embodiment, main processor 18 may be a general purpose processor designed to execute software of a variety of types. In some embodiments, main processor 18 may be a multi-core processor. Multi-core embodiments may be homogeneous (e.g., each core has substantially the same architecture) or heterogeneous (e.g., one or more of the cores may have a substantially different architecture relative to other cores). In heterogeneous multi-core embodiments, the various processor cores may be optimized for different goals. For example, one processor core may be optimized for maximum performance (e.g., in instructions executed per unit time), while another processor core may be optimized to for power efficiency (e.g., to minimize power consumed for various processing workloads).

In addition to one or more processor cores, main processor 18 may also include a memory controller that is coupled to main memory 17. The memory controller implemented on main processor 18 may interface with the cores and other functional circuit blocks implemented on the same integrated circuit die. Furthermore, other functional circuit blocks implemented elsewhere in computer system 10 may also interface with the memory controller implemented on main processor 18 for access to main memory 17.

Computer system 10 in the embodiment shown includes platform controller hub (PCH) 14 coupled to main processor 18. PCH 14 may include a number of different functional circuit blocks used to provide interfacing and communications with other portions of computer system 10. For example, PCH 14 in the embodiment shown is coupled to a network interface 15 (e.g., such as network interface chip or card) to provide communications between computer system 10 and other systems coupled to a network. PCH 14 may also include a display controller, a real-time clock circuit, and an I/O controller, among other functional circuit blocks. PCH 14 may facilitate an interface with various types of peripherals on corresponding bus types. Such bus types may include PCI/PCIe, USB, and other commonly known communications buses. It is noted that embodiments are possible and contemplated wherein function of PCH 14 are incorporated into main processor 18, and thus the disclosure is not limited to embodiments in which these units are separate entities.

PCH 14 may also include power management circuitry. The power management circuitry may perform actions such as power and/or clock gating of idle functional circuit blocks, restoring power/clock to circuit blocks exiting a sleep state, adjusting operating voltages for varying operating conditions, and so forth.

Auxiliary processor 12 in the embodiment shown may perform a number of functions that support operations of computer system 10. In the simplified embodiment shown, auxiliary processor 12 includes a system management controller (SMC) 122, a processor 123, a non-volatile (NV) memory 121, and a switch fabric 125 that may provide communications links between these circuits. Auxiliary processor 12 may include a number of other functional circuit blocks that are not shown here for the sake of simplicity. A more detailed embodiment of auxiliary processor 12 is discussed below.

Auxiliary processor 12 also includes a mechanism for storing a unique identifier, ID 19. In one embodiment, a bank of fuses may be used to store ID 19 as a unique combination of blown and unblown fuses. Embodiments that store ID 19 in a non-volatile memory (e.g., read-only memory, or ROM), or other suitable mechanism are also possible and contemplated.

NV memory 121 in the embodiment shown may store information that may be used by computer system 10 to conduct various operations. As shown herein, NV memory 121 stores boot code in a binary format that may be executed by main processor 18 during a system boot (e.g., start-up) procedure. In one embodiment, the NV memory 121 is the sole source of boot code. NV memory 121 also stores verification code that may be executed by processor 123 to verify the boot code. Execution of the verification code may determine if the boot code is uncorrupted and/or has not been subject to tampering. This may include comparing a hash of the boot code to a known hash value, verifying the presence of a manufacturer's signature, and so on. Furthermore, the verification may include determining that the boot code is associated with an identifier that is unique to that particular computer system. Auxiliary processor 12 in the embodiment shown is configured to release the boot code for transfer to main processor 18 (via PCH 14) after it has been successfully verified. In one embodiment, the boot code includes code conforming to the unified extensible firmware interface (UEFI) specification. However, the disclosure herein is not intended to be limiting to this specification, and thus embodiments in which the boot code conform to other specifications, formats, etc., are possible and contemplated.

NV memory 121 may also store variables used to set certain parameters and/or used by main processor 18 during the execution of the boot code. In some embodiments, NV memory 121 may store information to enable different operating systems to be utilized by computer system 10 according to inputs from a user during the boot procedure. In addition to information for boot services, runtime information may also store on NV memory 121. In general, NV memory 121 may store any information used to provide an interface between an operating system executing on main processor 18 and system firmware. Furthermore NV memory 121 may also store information used to ensure the security of computer system 10 against various types of attacks (e.g., malware, etc.).

NV memory 121 may be implemented using any suitable type of memory technology that enables contents stored thereon to remain even after power has been removed. In one embodiment, NV memory 121 may be implemented using flash memory. However, other types of memory (e.g., EPROM) may be used to implement NV memory 121 in other embodiments.

Processor 123 in the embodiment shown may perform various functions related to security of computer system 10. Among these functions is controlling access to and verifying the information stored in NV memory 121. For example, processor 123 may perform verification of the boot code to insure the integrity of its contents before it is release to the main processor for execution. Processor 123 may also operate in conjunction with the mailbox mechanism and the filter circuit, as mentioned above and discussed in further detail below.

During a boot procedure, main processor 18 may request access (e.g., read access) to variables stored in NV memory 121. Processor 123 may control access to a given variable by determining if main processor 18 is authorized access thereto, and may also limit access to one variable at any given time (e.g., one per request). Similarly, if access to a variable is requested at any time during system operation by main processor 123 or another agent, processor 123 may control access thereto in a similar manner. Processor 123 may also may perform a comparison of a hash of the boot code to an expected value in order to verify the information is uncorrupted.

SMC 122 in the embodiment shown may perform various management functions pertaining to computer system 10. Such functions include causing the main processor 18 to remain in a reset state upon system startup until such time that it is ready to receive verified boot code from auxiliary processor 12. Upon processor 123 completing successful verification of boot code during a system boot procedure, SMC 122 may provide an indication to PCH that the boot code is ready to be conveyed to main processor 18. Power management circuitry in PCH 14 may then release main processor 18 and send a request for the boot code to auxiliary processor 12. Responsive to the request, auxiliary processor 12 may provide the boot code to PCH 14, which may then relay it to main processor 18. Main processor 18 may then begin execution of the boot code to continue the boot procedure.

Switch fabric 125 in the embodiment shown may implement a network topology to provide interconnections between the various functional circuit blocks shown in FIG. 1, as well as others that may be present but are otherwise not shown. Switch fabric 125 may include a number of network switches (e.g., crossbar switches). These switches may facilitate communications between the various functional circuit blocks, as well as with circuitry external to auxiliary processor 12.

Figure 2:
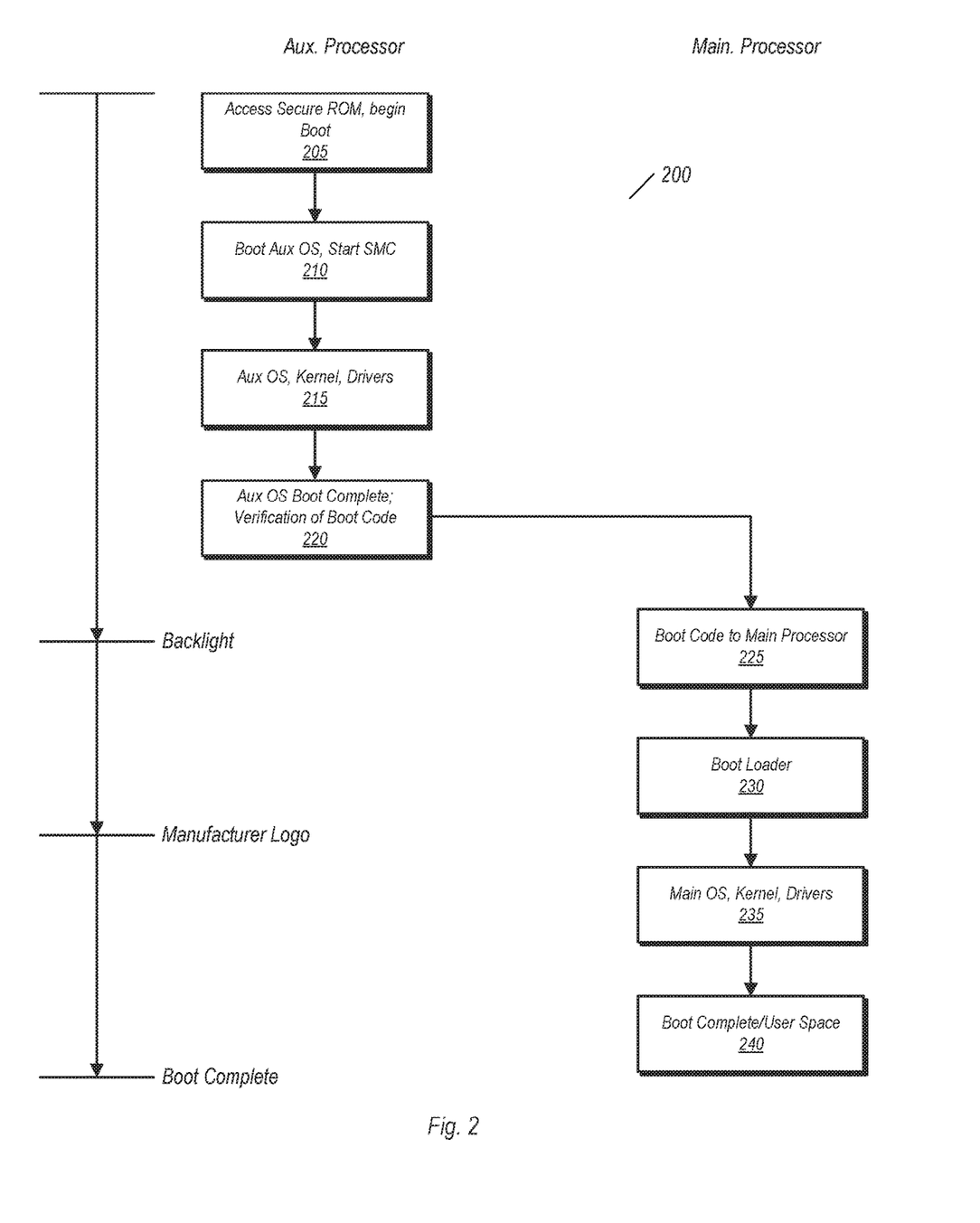
FIG. 2 is a simplified flow diagram illustrating a boot procedure in one embodiment of a computer system.

FIG. 2 is a simplified flow diagram illustrating a boot procedure in one embodiment of a computer system. Method 200 may be performed by various embodiments of the hardware disclosed herein. It is further contemplated that hardware embodiments not explicitly disclosed herein may also carry out method 200, and may thus fall within the scope of this disclosure.

As shown herein, method 200 illustrates various method tasks performed by an auxiliary processor and a main processor. Generally speaking, in the boot procedure discussed herein, an auxiliary processor may begin booting prior to the main processor. As part or at completion of the boot procedure for the auxiliary processor, boot code used by the main processor may be verified by circuitry within the auxiliary processor. Such verification may include ensuring that the boot code is uncorrupted, and has any necessary signatures (e.g., signed by the manufacturer). Upon successful verification, the boot code may be conveyed to the main processor for execution. Such a boot procedure may be referred to as a secure boot, as the verification of the boot code by secure circuitry within the auxiliary processor.

Method 200 begins with the access of a secure read-only memory (ROM) to begin the boot procedure (block 205). The secure ROM may store code that is executed by processing circuitry within the auxiliary processor in the booting. The secure ROM in various embodiments is located within the auxiliary processor. Furthermore, the secure ROM may be invisible to any component external to the auxiliary processor.

In block 210, an operating system (OS) used by the auxiliary processor is booted, and a system management controller (SMC) within the auxiliary processor may be started. The OS booted by the auxiliary system may be separate from that used by the main processor during normal system operations. Starting the SMC may include applying power thereto or otherwise removing it from a reset state.

Method 200 continues with the ongoing boot of the auxiliary OS, which includes loading a kernel and various drivers (block 215). The drivers may include any drivers used to operate other components on the auxiliary processor, such as those that may be used to facilitate communications with external devices (e.g., a platform controller hub, main processor, etc.).

Upon completion of the auxiliary OS boot procedure in this particular embodiment, a verification of the boot code is performed (block 220). Verification of the boot code may generally ensure that the boot code has not been subject to tampering or inadvertent corruption. The verification may also include ensuring that the boot code is associated with an identifier that is unique to the computer system.

At this point method 200, the booting of the main processor may begin. The boot code may be conveyed from the auxiliary processor the main processor (block 225), and a backlight of the computer system display may come on. Upon its receipt, the main processor may begin executing the boot code. Executing the boot code may include executing a boot loader routine for a main OS (block 230). As defined herein, the main OS may be that which is used by the computer system during normal operations, and through which a user interacts with the computer system. As the boot loader is executed, a manufacturer logo may appear on the system display.

Responsive to the execution of the boot loader, the main OS is invoked, with the main processor causing the activation of the system kernel and various system drivers (block 235). Upon completing the activation of the system kernel and drivers, the boot procedure may be complete, and the computer system may be ready for operations by a user (block 240).

Figure 3:
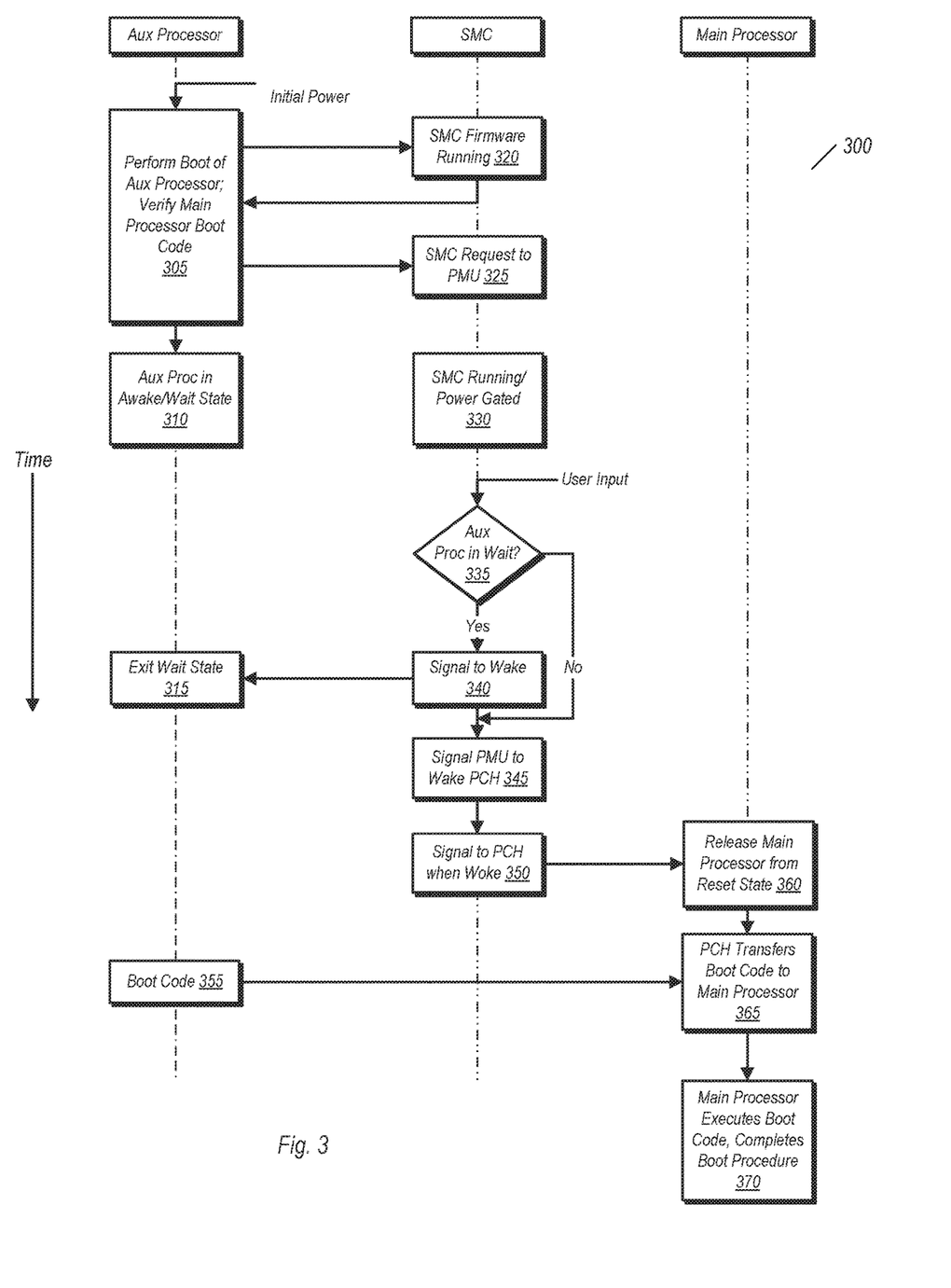
FIG. 3 is a flow diagram illustrating additional details of a boot procedure for one embodiment of a computer system.

FIG. 3 is a flow diagram illustrating additional details of a boot procedure for one embodiment of a computer system. Method 300 provides further illustration of the operations carried about by the auxiliary and main processors, as well as the SMC implemented on the auxiliary processor.

Responsive to initial power being applied to the computer system (e.g., the computer system is plugged into a wall outlet), a boot of the auxiliary processor along with verification of boot code for a main processor is performed (block 305). In conjunction with the boot of the auxiliary processor, SMC firmware may be initialized. Once the SMC firmware is running (block 320), it may provide an indication of the same to other circuitry within the auxiliary processor. When the SMC firmware is running, it may send a request to a power management unit (PMU) in the computer system to allow power to be applied to certain portions, such as a bus to enable communications between the auxiliary processor and other units within the system.

After completing the boot process, if no other external interaction with the computer system has taken place, the auxiliary processor may enter a wait state (block 310). Similarly, the SMC may either remain running or may be placed into a power gated state while idle (block 330).

Responsive to user input (e.g., a user pressing a power button on the computer system), the boot procedure may continue. The user input may cause the SMC to exit the power gated state if it is not otherwise active. If the remaining circuitry in the auxiliary processor is in a wait state (block 335, yes), a wakeup signal may be sent thereto by the SMC. Responsive to receiving the wake signal, any circuitry within auxiliary processor that is in a wait state may be brought into a fully active state. After the wake signal has been sent to the other circuitry in the auxiliary processor, or the auxiliary processor was already in a fully awakened state (block 335, no), the SMC may send a signal to the power management unit to wake the PCH (block 345).

When the PCH is in the awakened state, the SMC may transmit a signal thereto (block 350) in order to indicate that the boot code has been verified and is ready to be conveyed to the main processor. The PCH may then release the main processor from the reset state (block 360). The auxiliary processor may then release the boot code for transfer (block 355), with the PCH responding by transferring the boot code to the main processor (block 365). Thereafter, the main processor may execute the boot code to load an OS and complete the boot procedure.

Figure 4:
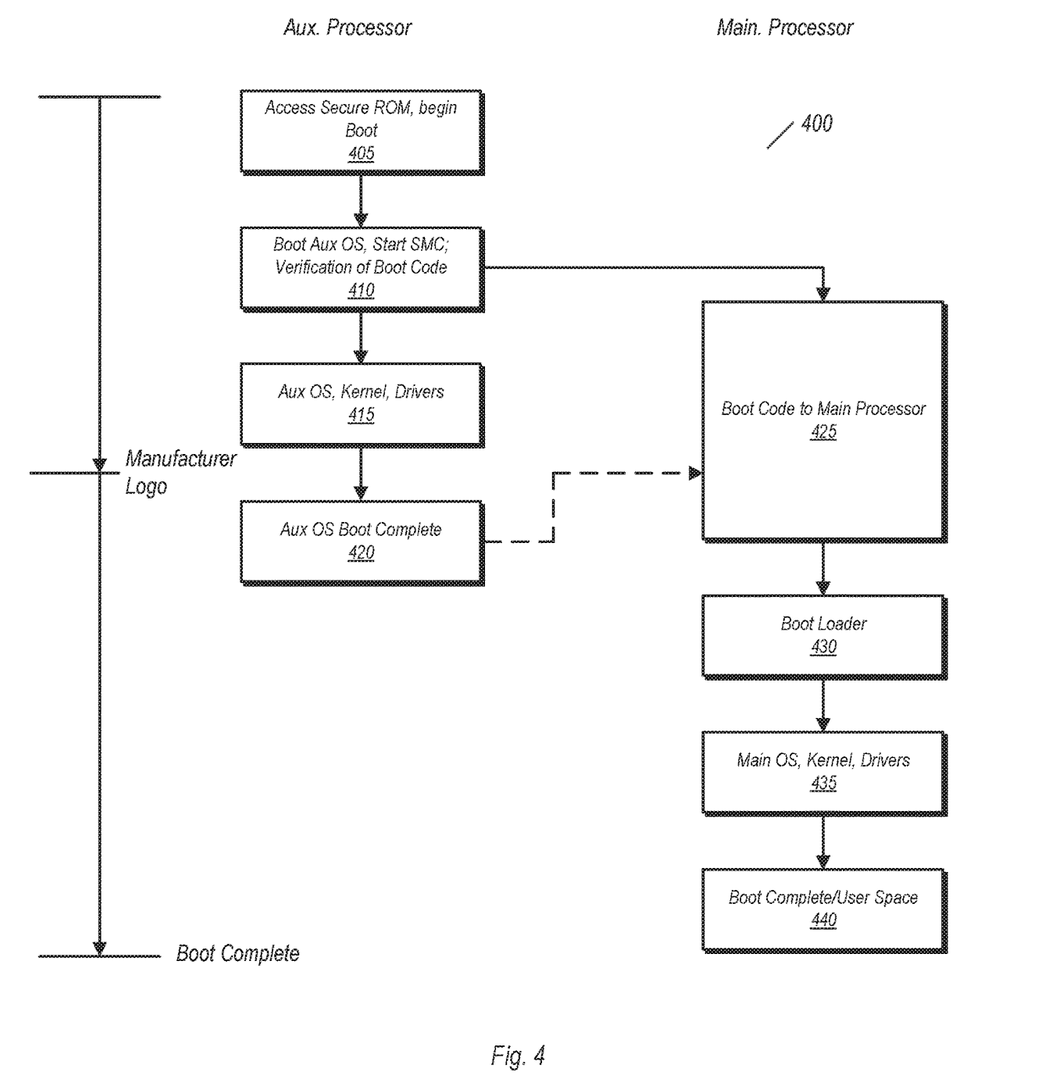
FIG. 4 a simplified flow diagram illustrating another embodiment of a boot procedure for a computer system.

In some embodiments of a computer system according to this disclosure, booting of the main and auxiliary processor may occur concurrently. The may enable an overall faster boot procedure to occur. As part of such a boot procedure, a manufacturer logo may appear on a display of the computer system earlier than it would relative to the embodiment discussed in conjunction with FIG. 2. As a part of this boot procedure, verification of the main boot code (i.e. the boot code for the main processor) may occur before the auxiliary processor is fully booted. FIG. 4 is a simplified block diagram of one such embodiment.

Method 400 begins with processing circuitry within the auxiliary processor accessing secure ROM and beginning the boot procedure (block 405). As part of the execution of the code from the secure ROM, the SMC is started and verification of the boot code is performed (block 410). Upon successful completion of the verification process, the boot code may be forwarded to the main processor (block 425), and execution of the same may begin. Thus, at this point of the boot procedure, both the auxiliary and main processors are concurrently booting.

The auxiliary processor may complete its booting by loading the auxiliary OS kernel and various drivers (block 415), executing code from the secure ROM until the booting of the auxiliary OS is complete (block 420). The manufacturer's logo may appear on a display of the computer system while the main processor is executing the boot code received thereby, and while the auxiliary processor is still executing code from the secure ROM.

The main processor may continue its boot procedure by invoking a boot loader to load the OS (block 430). Thereafter, the main OS kernel and drivers may be loaded and activated (block 435). Thereafter, the boot procedure may complete itself, and the computer system may be ready for operation by a user (block 440).

As previously noted, part of the boot code verification process in some embodiments of a computer system may include determining whether the boot code is associated with a unique identifier for the computer system. Associating the boot code with an identifier unique to a particular system (or particular chip in the system) may be known as "personalization." Through personalization, a particular instance of boot code (or other information) may be uniquely associated with a particular system such that the same code would be prevented from executing on another system. Boot code that is executable on a particular system based on a unique identifier may be said to be personalized to that particular system.

In many computer systems, integrated circuits such as a main processor may have their own, unique identifier. The identifier may be implemented by, e.g., blowing fuses in the integrated circuit, storing the identifier in a portion of a non-volatile memory, or by other mechanisms. This unique identifier may also be embedded into files that also include the boot code. When the boot code is verified, the identifier may be checked along with the known identifier of the computer system to ensure there is a match. If there is no match, the boot may not proceed with the current boot code, and other mechanisms may be invoked. In such a case, the computer system may enter a recovery mode, or operate using a recovery OS. In the recovery mode/OS, the computer system may have a reduced set of capabilities relative to a normal OS through which normal operations are conducted (e.g., by a user, with full system capabilities activated and ready).

Figure 5:
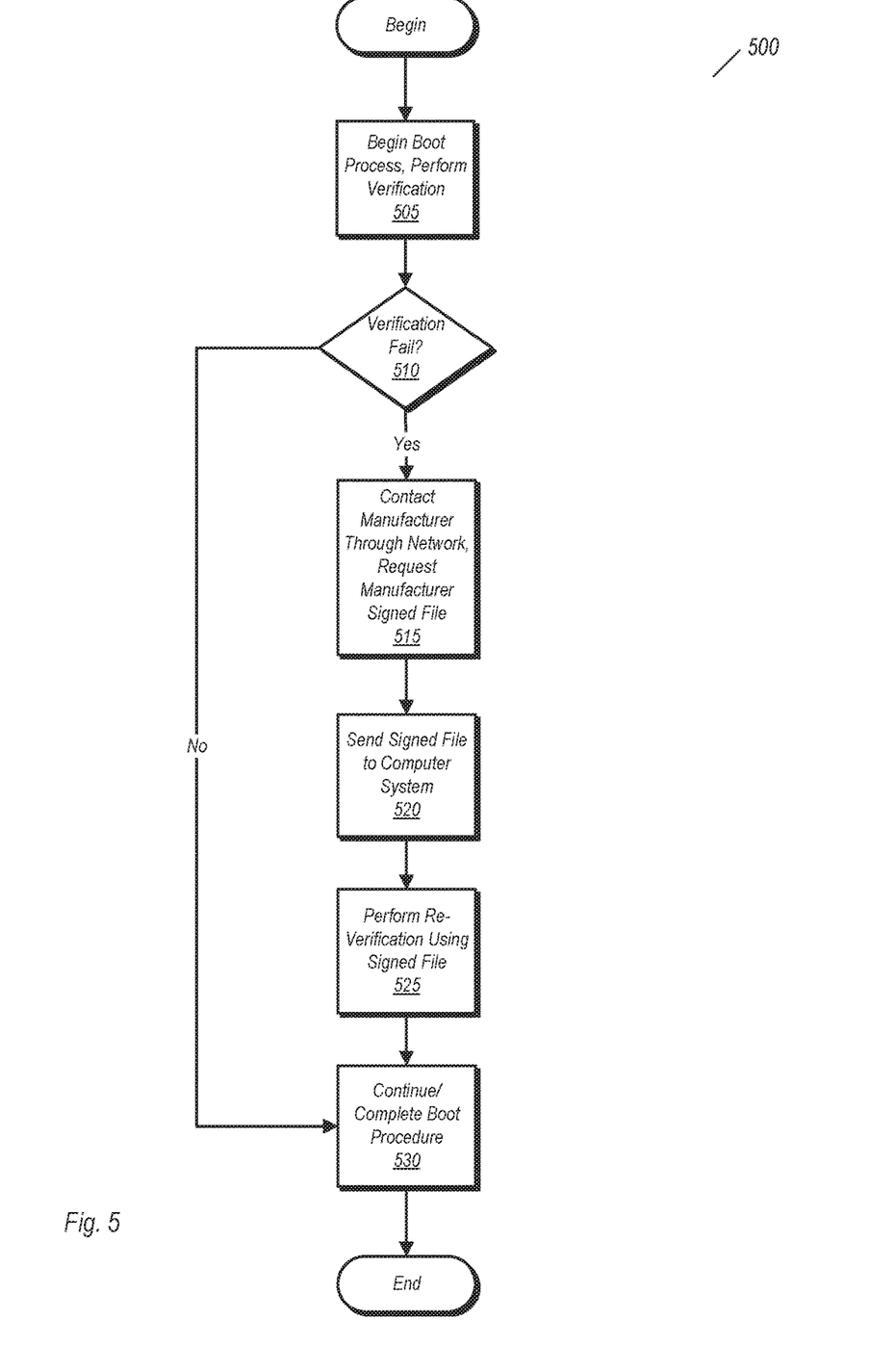
FIG. 5 is a flow diagram illustrating one embodiment of operations in a recovery operating system.

FIG. 5 is a flow diagram illustrating one embodiment of operations in a recovery operating system. More particularly, method 500 illustrates one embodiment of a methodology where a system may eventually be booted after an initial verification failure in which the identifier of the boot code did not match that of the system identifier.

Method 500 begins with the initiation of a boot procedure which includes a verification of the boot code (block 505). Additionally, the verification may include checking an identifier of the boot code against a unique identifier associate with the computer system (e.g., an identifier embedded in the main processor). If the verification does not fail (block 510, no), then the method may continue at block 530 with the continuation and eventual completion of the boot process.

If the verification fails (block 510, yes) e.g., because the identifier associated with the boot code does not match the unique system identifier, then the computer system may enter a recovery mode/OS and the manufacture may be contacted with a request to send a signed file (block 515). In sending the request, the unique identifier of the computer system may be included, along with other relevant information, such as type of computer, system configuration, and so on. The manufacturer may then generate a file or files that include the boot code. These files may be associated with the unique system identifier and may each be signed by the manufacturer. Upon completion of file generation, the manufacturer may send the files back to the requesting computer system (block 520).

Once the files have been received, they may be stored in the system. For example, the auxiliary processor may replace the boot code that failed verification with the newly received boot code in the NV memory. Thereafter, the boot procedure may be re-started by performing a re-verification with the newly received/signed files (block 525). Upon completing the re-verification, the boot process may continue to completion (block 530).

Figure 6:
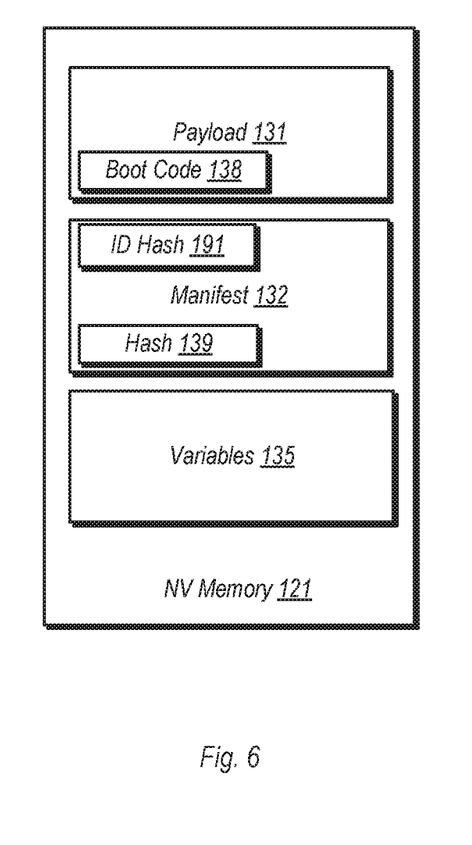
FIG. 6 is a block diagram illustrating information stored in one embodiment of a non-volatile memory implemented on an auxiliary processor.

FIG. 6 is a block diagram illustrating information stored in one embodiment of a non-volatile memory implemented on an auxiliary processor. In the embodiment shown, NV memory 121 includes a payload 131, a manifest 132, and a set of variables 135. Payload 131 includes boot code 138, while manifest 132 includes a hash 139 that may be used as part of a verification of the boot code 138. In some embodiments, a single file may include at least the payload 131 and manifest 132, although these may be separate as shown here. Furthermore, multiple instances of these files may be present in some embodiments. For example, in a computer system capable of booting into multiple, different OS's, multiple instances of payload 131 (with corresponding, multiple instances of boot code 138) may be present. A boot procedure in such a system may include a user selecting which OS to which the computer is to be booted.

During the verification process, circuitry in the auxiliary processor may create a hash from the boot code 138. This hash may be compared with the hash 139 in manifest 132. If the boot code has not been altered in any way, the hash created from the boot code should match hash 139.

The manifest may also include other information, such as a signature from the manufacturer, identification information, and so on. In the embodiment shown, manifest 132 includes an ID hash 191, which may be used in checking a unique identifier (e.g., ID 19 on auxiliary processor 12 of FIG. 1) during certain operations (e.g., boot). Circuitry in the auxiliary processor may create a hash from ID 19, and compare that with ID hash 191 in order to perform the ID verification as part of the personalization discussed above. In addition to the boot code 138, payload 131 may also include other information, such as type and version information.

Variables 135 may include a wide variety of information. Variables may include system configuration variables regarding drivers to invoke, operational modes, security related variables, variables used in the boot process, and so forth.

Access to the variables stored in NV memory 121 may be tightly controlled by the auxiliary processor. Responsive to receiving a request for access to a variable stored in NV memory 121, auxiliary processor 12 may execute a security policy to determine whether variables may be overwritten and/or deleted and whether they may be accessed by the requesting agent, such as the main processor. Executing the security policy may include executing code to determine whether the requesting agent meets various criteria for performing the desired operations with the requested variable. The criteria may include credentials such as a password, an identifier or other information. Furthermore, as will be discussed below, embodiments are possible and contemplated wherein the auxiliary processor may control access to variables such that only one variable at a time may be accessed. The various mechanisms for protecting variables stored in NV memory 121 will now be discussed in further detail with reference to FIG. 7, along with other aspects of an embodiment of an auxiliary processor.

Figure 7:
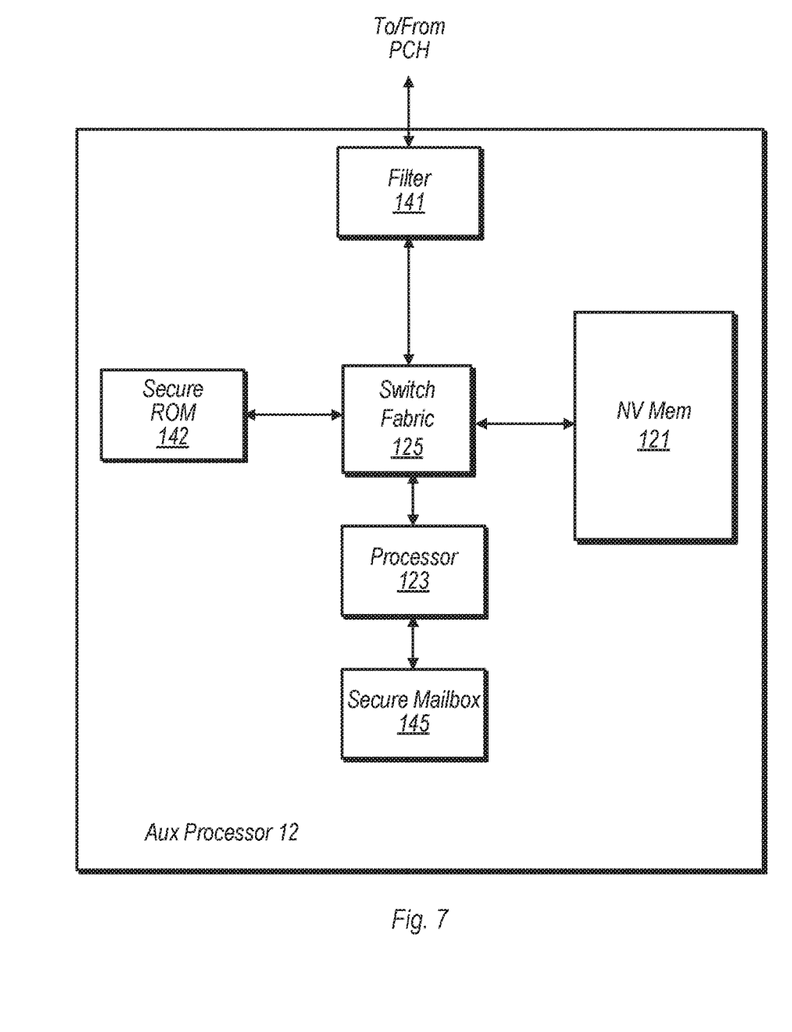
FIG. 7 is a block diagram of additional details of one embodiment of an auxiliary processor.

Turning now to FIG. 7, a block diagram of illustrating further details of auxiliary processor 12 is depicted. In the illustrated embodiment, auxiliary processor 12 includes at least one processor 123 (which may be referred to as a secure enclave processor, or SEP), filter 141, secure mailbox 142, and secure ROM 142. In some embodiments, auxiliary processor 12 may include more (or less) components than shown in FIG. 7. For example, embodiments including cryptography circuitry are possible and contemplated. Through mechanisms such as the secure mailbox 142 and filter 141, auxiliary processor 12 implements a secure circuit that protects internal resources, e.g., such as NV memory 121 and the contents stored therein.

Filter 141, in one embodiment, is circuitry configured to tightly control access to auxiliary processor 12 to increase the isolation of the circuitry therein from the rest of the computer system 10. More particularly, in one embodiment, filter 141 may permit read/write operations to enter auxiliary processor 12, via the switch fabric only if the operations address the secure mailbox 142. Other operations may not progress from the filter 141 into the switch fabric 125 auxiliary processor 12. Even more particularly, filter 141 may permit write operations to the address assigned to the inbox portion of secure mailbox 142, and read operations to the address assigned to the outbox portion of the secure mailbox 142. All other read/write operations may be prevented/filtered by the filter 141. In some embodiments, filter 141 may respond to other read/write operations with an error. In one embodiment, filter 141 may sink write data associated with a filtered write operation without passing the write data on to local interconnect 125. In one embodiment, filter 141 may supply nonce data as read data for a filtered read operation. Nonce data (e.g., "garbage data") may generally be data that is not associated with the addressed resource within the auxiliary processor 12. Filter 141 may supply any data as nonce data (e.g. all zeros, all ones, random data from a random number generator, data programmed into filter 141 to respond as read data, the address of the read transaction, etc.).

In various embodiments, filter 141 may only filter incoming read/write operations. Thus, the components internal to auxiliary processor 12 may have full access to the other components of computing device 10, for example main memory 17. Accordingly, filter 141 may not filter responses from fabric 125 that are provided in response to read/write operations issued by components internal to auxiliary processor 12, such as processor 123.

Secure mailbox 142, in one embodiment, is circuitry that includes an inbox and an outbox. As shown herein, secure mailbox 142 is coupled to processor 123, which may control writes thereto and reads therefrom. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from the fabric 125 (e.g. issued by one of cores of main processor 18). The outbox may store write data from write operations sourced by processor 123 (which may be read by read operations sourced from fabric 125, e.g. read operations issued by processor 110). (As used herein, a "mailbox mechanism" refers to a memory circuit that temporarily stores 1) an input for a secure circuit until it can be retrieved by the circuit and/or 2) an output of a secure circuit until it can be retrieved by an external circuit).

In some embodiments, software executing on main processor 18 (or various hardware such as peripherals not otherwise shown) may request services of a component or components within auxiliary processor 12 via an application programming interface (API) supported by an operating system of computer system 10—i.e., a requester may make API calls that request services of some component within. These calls may cause an operating system executing on processor 18 to write corresponding requests to secure mailbox 145, which are then retrieved and analyzed by processor 123 to determine whether it should service the requests. By isolating the components within auxiliary processor 12 in this manner, overall security of the system may be enhanced.

Processor 123, in one embodiment, is configured to process commands received from various sources in computing device 10 (e.g. from main processor 18) and may use various secure peripherals to accomplish the commands. In various embodiments, processor 123 may execute securely loaded software that facilitates implementing functionality descried with respect to auxiliary processor 12. This software may include encrypted program instructions loaded from a trusted zone in NVM 121 or secure ROM 142. Furthermore, processor 123 may limit access to variables used by main processor 18 during a boot procedure. For example, in one embodiment, during the boot procedure, processor 123 may limit access to variables from NVM 121 to one variable at a time. Thus, main processor 18 may be required to send separate requests for each variable it wishes to access.

Control of access to variables may also require that a requesting agent meet certain criteria. For example, main processor 18 may be required to provide credentials such as the unique identifier discussed above, a password, or other information that indicates that it is authorized to access the variables. Furthermore, any agent that wishes to alter (e.g., overwrite or change) or delete a variable may also be required to provide credentials indicating they are authorized to perform such actions.

Processor 123 may also perform functions to verify boot code used by main processor 18 during the boot procedure. For example, referring back to FIG. 6, processor 123 may perform a comparison of hash 139 stored as part of manifest 132 to a hash of boot code 138. If the hashes match, processor 123 may then allow the boot code to be released and provided to main processor 18. Otherwise, the boot code is not released, and alternate procedures may be taken to boot computer system 10 (e.g., obtaining files signed and verified by the manufacturer).

Secure ROM 142, in one embodiment, is a memory configured to program instruction for booting processor 123. In some embodiments, ROM 142 may respond to only a specific address range assigned to secure ROM 142 on switch fabric 125. The address range may be hardwired, and processor 123 may be hardwired to fetch from the address range at boot in order to boot from secure ROM 142. Filter 141 may filter addresses within the address range assigned to secure ROM 142 (as mentioned above), preventing access to secure ROM 142 from components external to the security circuit 123. In some embodiments, secure ROM 142 may include other software executed by processor 143 during use. This software may include the program instructions to process inbox messages and generate outbox messages, code to interface to a cryptographic engine (not shown here), etc.

Figure 8:
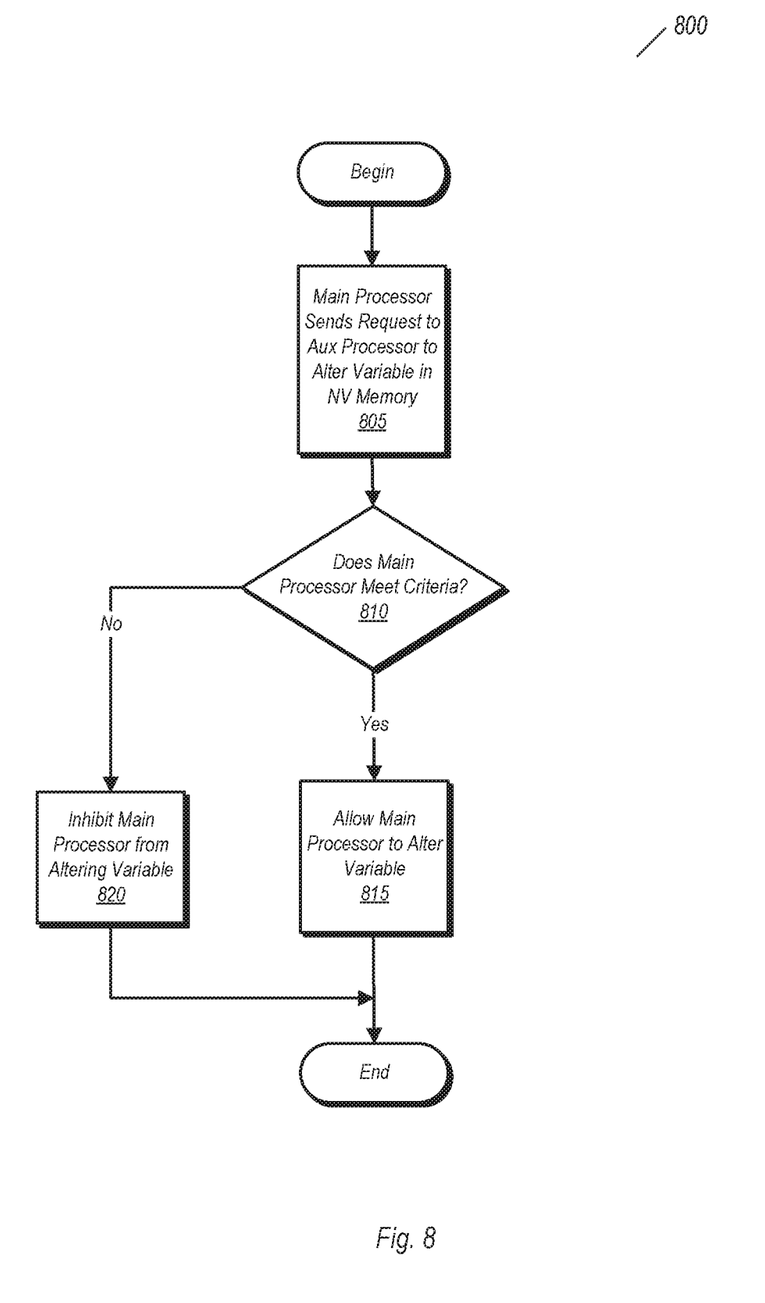
FIG. 8 is a flow diagram of one embodiment of a method for determining whether a variable stored in non-volatile memory may be overwritten.

FIG. 8 is a flow diagram of one embodiment of a method for determining whether a variable stored in non-volatile memory may be overwritten. Method 800 may be performed by the auxiliary processor discussed above using filter 141, processor 123, and secure mailbox 142. However, other embodiments of an auxiliary processor (and more generally, secure circuitry) may also be able to perform the method shown herein, and thus may fall within the scope of this disclosure.

It is noted that while method 800 is directed to a main processor sending requests, the broader methodology contemplated herein may allow for other agents sending the same types of requests. Thus, the use of the main processor in the illustrated embodiment should be considered exemplary.

Method 800 begins with the main processor sending a request to the auxiliary processor to alter a variable stored in NV memory (block 805). Altering the variable may comprise deleting the variable, changing the value of a variable, or overwriting the variable. In sending the request, the main processor may include an address along with information indicative of the nature of the request. As discussed above, if the address is not directed to the inbox portion of the secure mailbox, the request may be denied without any traffic entering the auxiliary processor.

If the request is allowed by the filter to enter the switch fabric, circuitry within the auxiliary processor (e.g., processor 123 of FIG. 7) may determine if the main processor meets the criteria for the request. For example, the processor 123 may determine if the main processor has provided an identifier, a password, or other information that would indicate authorization to alter the variable. Furthermore, in some embodiments, the altering of at least some variables may be limited to certain modes of operation, such as a recovery mode. Thus, the mode of operation may also be criteria considered for the altering of variables.

If the main processor does not meet the criteria for altering the variables (block 810, no), it may be inhibited from doing so (block 820). In some embodiments, the auxiliary processor may send an indication to the main processor that its request has been denied. However, embodiments in which no indication of the request denial is sent are also possible and contemplated.

If it is determined that all criteria have been met for altering the variable (block 810, yes), then the main processor may be allowed to do so (block 815). If the value of the variable is to be changed or overwritten, the main processor may be allowed, via the secure processor, to write the desired information into the inbox of the secure mailbox. Thereafter, the secure processor may complete the operation by writing the desired information to the NV memory. If the variable is to be deleted, the information indicating the deletion may be written into the inbox of the secure mailbox, with the secure processor carrying out the actual deletion thereafter.

Figure 9:
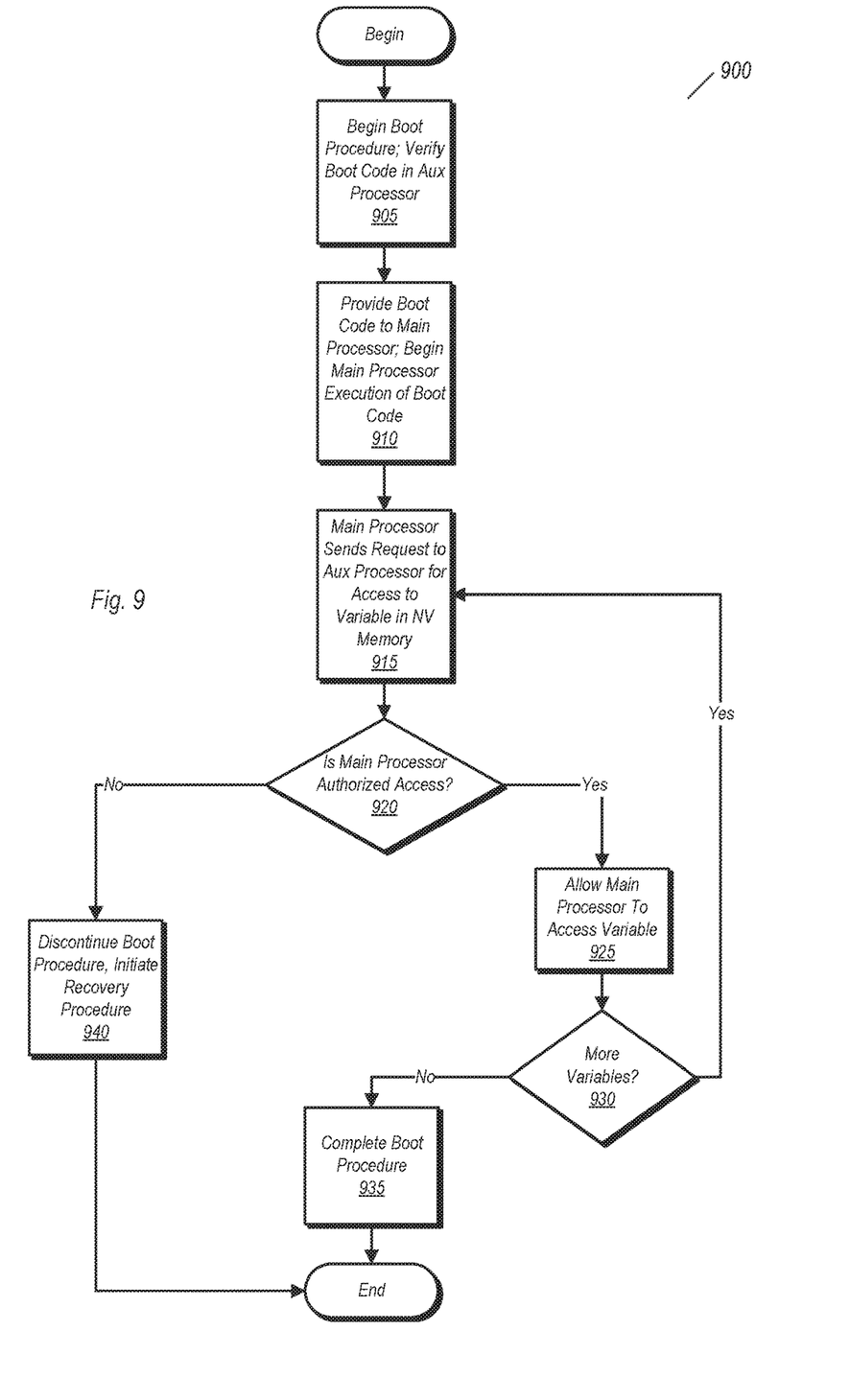
FIG. 9 is a flow diagram of one embodiment of a method for determining whether to grant access to a variable stored in a non-volatile memory during a system boot procedure.

FIG. 9 is a flow diagram of one embodiment of a method for determining whether to grant access to a variable stored in a non-volatile memory during a system boot procedure. It is noted that while the exemplary embodiment is directed to a boot procedure, portions of method 900 may be performed outside of the boot procedure, and thus are contemplated as alternate embodiments. Furthermore, while method 900 contemplates access requests made by a main processor, embodiments are possible and contemplated in which other agents request access to variables stored in an NV memory of an auxiliary processor.

Method 900 begins with the performing of a boot procedure, including the verification of main processor boot code by the auxiliary processor (block 905). In one embodiment, the boot code may be accessed solely from the NV memory of the auxiliary processor. Upon completing the verification, the main boot code may be conveyed to the main processor, where it may be executed to begin the main processor portion of the boot procedure (block 910). During the boot procedure, the main processor may send a request to the auxiliary processor for access (e.g., read access) to a variable stored within the NV memory (block 915). Responsive to the request, a secure processor or other circuitry within the auxiliary processor may execute a security policy to determine if the main processor is authorized access to the variable.

If it is determined that the main processor is authorized access to the variable (block 920, yes), the auxiliary processor may grant the request and allow access by the main processor (block 925). Access to the variable may depend on the nature of the request. For example, if the request is a read request, a secure processor may read the variable from the NV memory and deposit it in an outbox of the secure mailbox. Thereafter, the variable may be forwarded to the main processor.

If more variables are to be accessed (block 930, yes), the method may return to block 915 and the cycle may repeat as necessary. If no more variables are to be access (block 930, no), then the boot procedure may continue running to completion (block 935).

In the event that it is determined that the main processor is not authorized to access the variable (block 920, no), the boot procedure may be discontinued and the computer system may initiate recovery procedures (block 940). For example, the computer system may be re-directed to enter a recovery mode responsive to the denial of a request to a variable during the boot procedure.

Numerous variations and modifications will become apparent to those skilled in the art once the above disclosure is fully appreciated. It is intended that the following claims be interpreted to embrace all such variations and modifications.

What is claimed is:

1. A method, comprising:
    booting a first operating system on a first processor of a computer system, wherein the booting includes loading a kernel and drivers of the first operating system;
    performing, using the first processor, a verification of boot code for a second processor of the computer system, by the first processor:
        accessing a file that includes a signature, a hash of the boot code, data corresponding to a unique identifier that is included in the first processor and that is unique to the computer system;
        determining whether the data corresponds to the unique identifier that is included in the first processor;
        determining whether the boot code corresponds to the hash of the boot code; and
        verifying the signature;
    subsequent to the verification, releasing the second processor from a reset state;
    providing the boot code to the second processor; and
    the second processor executing the boot code to boot a second operating system, wherein the second operating system is distinct from the first operating system.

2. The method of claim 1, wherein the data is a hash of the unique identifier and included with the boot code, and wherein the verification comprises:
    creating a hash of the unique identifier included in the first processor; and
    comparing the hash included with the boot code and the created hash.

3. The method of claim 1, wherein the boot code is stored in a non-volatile memory implemented on the first processor, and wherein the boot code comprises code conforming to a unified extensible firmware interface (UEFI) specification.

4. The method of claim 1, further comprising:
a system management circuit implemented in the first processor providing an indication that the boot code has been verified; and
a platform controller hub circuit of the computer system, responsive to receiving the indication, retrieving the boot code and providing the boot code to the second processor.

5. The method of claim 1, wherein the file includes the hash of the boot code, a hash of the unique identifier, and a signature of a manufacturer.

6. The method of claim 5, wherein the file is associated with a corresponding one of a plurality of operating systems each having a corresponding file, and wherein the method further comprises the second processor executing instructions to load an operating system corresponding to the file.

7. The method of claim 1, further comprising:
the first processor performing the verification of the boot code prior to the loading of the kernel and the drivers of the first operating system; and
the second processor beginning execution of the boot code prior to completion of the booting of the first operating system on the first processor.

8. The method of claim 1, further comprising:
performing one or more verifications, including the verification of the boot code;
responsive to failing one of the one or more verifications, loading a recovery operating system;
obtaining a signed file via a network connection while operating in the recovery operating system;
performing a re-verification using the signed file; and
continuing a boot procedure for the computer system responsive to completing the re-verification.

9. The method of claim 1, further comprising:
the first processor enforcing a security policy controlling access, by the second processor, to one or more variables associated with the boot code and stored in a non-volatile memory accessible to the first processor.

10. The method of claim 9, wherein the security policy controls authorization to change the one or more variables stored in the non-volatile memory.

11. A computer system, comprising:
a main processor;
an auxiliary processor including a first identifier that is unique to the computer system; and
non-volatile memory storing boot code and a file that includes a hash of the boot code, second identifier, and a signature;
wherein, during a boot process, the auxiliary processor is configured to:
boot a first operating system on the auxiliary processor including loading a kernel and drivers on the auxiliary processor, wherein the boot code is executable to boot a second operating system distinct from the first operating system;
perform a verification of the boot code that includes verifying:
the boot code against the hash of the boot code;
the first identifier against the second identifier; and
the signature; and
responsive to the verification, cause the main processor to be released from a reset state and the boot code to be provided to the main processor; and
wherein the main processor is configured to execute the boot code to continue the boot process.

12. The computer system of claim 11, wherein the auxiliary processor includes the non-volatile memory having the boot code for the main processor, and wherein the second identifier is a hash of the first identifier or is the first identifier.

13. The computer system of claim 11, wherein the auxiliary processor includes a system management circuit, and wherein the computer system further comprises a platform controller hub coupled to each of the auxiliary processor and the main processor, wherein the system management circuit is configured to provide an indication that the boot code has been verified, and wherein the platform controller hub is configured to, responsive to receiving the indication, provide the boot code to the main processor.

14. The computer system of claim 11, wherein the non-volatile memory is configured to store one or more files each including a hash used to verify the boot code, wherein each of the files includes a payload section comprising one or more objects and binary information, and a manifest section that includes information used by the auxiliary processor to verify the payload section.

15. The computer system of claim 11, wherein the auxiliary processor is configured to enforce a security policy controlling access to one or more variables associated with the boot code and stored in the non-volatile memory, wherein controlling access to the one or more variables includes controlling authorization to change the one or more variables.

16. The computer system of claim 11, wherein the main processor is configured to, during the boot process, execute code to perform one or more verifications subsequent to the auxiliary processor verifying the boot code, and, wherein responsive to failure of a particular verification in the computer system, obtain a signed file via a network connection to enable completion of the particular verification.

17. A method comprising:
storing, in a computer system, a file that includes a hash of boot code, data corresponding to a system identifier that is unique to the computer system, and a signature;
beginning performance of a boot procedure in the computer system responsive to an auxiliary processor receiving power, wherein the boot procedure includes the auxiliary processor booting a first operating system including loading a kernel and drivers of the first operating system;
verifying, by the auxiliary processor, the boot code for a main processor of the computer system, wherein verifying the boot code comprises:
comparing a system identifier against the data corresponding to the system identifier;
comparing the boot code against the hash of the boot code;
subsequent to verifying the boot code, releasing the main processor from a reset state;
providing an indication, from the auxiliary processor to a platform controller hub, that the boot code has been verified;
the platform controller hub transferring the boot code to the main processor; and
the main processor executing the boot code to boot a second operating system, wherein the second operating system is distinct from the first operating system.

18. The method of claim 17, wherein the boot code is stored in a non-volatile memory implemented on the auxiliary processor, and wherein the data is a hash of the system identifier or the system identifier.

19. The method of claim 17, further comprising:
the auxiliary processor enforcing a security policy that controls access to one or more boot variables stored in a non-volatile memory accessible to the auxiliary processor, wherein controlling access to the one or more boot variables includes controlling authorization to make changes to the one or more variables.

20. The method of claim 17, further comprising:
loading a selected one of one or more operating systems in accordance with a selected one of one or more files stored in a non-volatile memory accessible to the auxiliary processor.

\* \* \* \* \*